United States Patent
Rangapuram et al.

(10) Patent No.: US 9,158,804 B1
(45) Date of Patent: Oct. 13, 2015

(54) METHOD AND SYSTEM FOR EFFICIENT FILE-BASED BACKUPS BY REVERSE MAPPING CHANGED SECTORS/BLOCKS ON AN NTFS VOLUME TO FILES

(75) Inventors: Ravi Kishore Yadav Rangapuram, Bangalore (IN); Sriprasad Bhat Kasargod, Bellevue, WA (US)

(73) Assignee: EMC CORPORATION, Hopkinton, MA (US)

(*) Notice: Subject to any disclaimer, the term of this patent is extended or adjusted under 35 U.S.C. 154(b) by 377 days.

(21) Appl. No.: 13/336,894

(22) Filed: Dec. 23, 2011

(51) Int. Cl.
*G06F 17/30* (2006.01)
*G06F 11/14* (2006.01)

(52) U.S. Cl.
CPC ...... *G06F 17/30371* (2013.01); *G06F 11/1458* (2013.01); *G06F 17/30575* (2013.01)

(58) Field of Classification Search
CPC .......... G06F 11/1451; G06F 2201/835; G06F 11/1458; G06F 17/30306; G06F 17/30575; G06F 17/30578; G06F 11/1461; G06F 17/30067
USPC .................................. 707/644–647, 674–686
See application file for complete search history.

(56) References Cited

U.S. PATENT DOCUMENTS

| | | | | |
|---|---|---|---|---|
| 6,560,615 B1* | 5/2003 | Zayas et al. | ................... | 707/646 |
| 7,447,857 B2* | 11/2008 | Lyon | ............................. | 711/162 |
| 7,587,564 B2* | 9/2009 | Lorenz et al. | ................. | 711/162 |
| 7,814,056 B2* | 10/2010 | McGrattan et al. | .......... | 707/640 |
| 7,814,077 B2* | 10/2010 | Nguyen et al. | ................ | 707/695 |
| 7,890,469 B1* | 2/2011 | Maionchi et al. | ............. | 707/654 |
| 8,046,333 B1* | 10/2011 | Wang et al. | .................... | 707/646 |
| 8,200,637 B1* | 6/2012 | Stringham | ..................... | 707/670 |
| 8,621,165 B1* | 12/2013 | Sridharan et al. | ............ | 711/162 |
| 8,676,809 B1* | 3/2014 | Naftel | .............................. | 707/746 |
| 2008/0256314 A1* | 10/2008 | Anand et al. | .................. | 711/162 |
| 2009/0157711 A1* | 6/2009 | Baer et al. | ...................... | 707/101 |
| 2010/0076934 A1* | 3/2010 | Pershin et al. | ................ | 707/640 |
| 2011/0099152 A1* | 4/2011 | Law et al. | ...................... | 707/689 |

* cited by examiner

*Primary Examiner* — Michelle Owyang
(74) *Attorney, Agent, or Firm* — Dergosits & Noah LLP; Todd A. Noah (57) ABSTRACT

Changed files since a last backup are identified to be backed up by reverse mapping changed blocks to files. Block identifiers specifying blocks on a storage volume are received. A location of a file table zone is determined. The file table zone stores a file table of records. Each record stores a last modified timestamp for a file associated with the record. An intersection is created from the file table zone location and the block identifiers. The intersection includes a subset of records where each record in the subset is associated with a block from the file table zone that corresponds to a block identified by the block identifiers. The subset is parsed to extract timestamps. The timestamps are compared with the storage volume's last backup date. If the associated file was modified after the last backup date, a determination is made that the file should be backed up.

20 Claims, 7 Drawing Sheets

METHOD AND SYSTEM FOR EFFICIENT FILE-BASED BACKUPS BY REVERSE MAPPING CHANGED SECTORS/BLOCKS ON AN NTFS VOLUME TO FILES

BACKGROUND

The present invention relates to the field of information technology, including, more particularly, to systems and techniques for backing up and restoring data.

A backup or the process of backing up is making copies of data which may be used to restore the original after a data loss event. Examples of data loss events include data deletion or corruption (e.g., natural disasters, fire, floods, earthquake, human error, software bugs, hardware failure, or software viruses). Backups may also be used to recover data from an earlier time.

Making backups, however, can involve significant resources and time. For example, running a backup process can interfere with normal operations, there can be a performance impact on the system being backed up. For example, for the period of time that a computer system is being backed up, the hard drive is busy reading files for the purpose of backing up, and its full bandwidth is no longer available for other tasks. Backups across a network can affect network bandwidth.

Thus, there is a need to provide systems and techniques to increase the efficiency of data backup and recovery systems.

DETAILED DESCRIPTION

Figure 1:
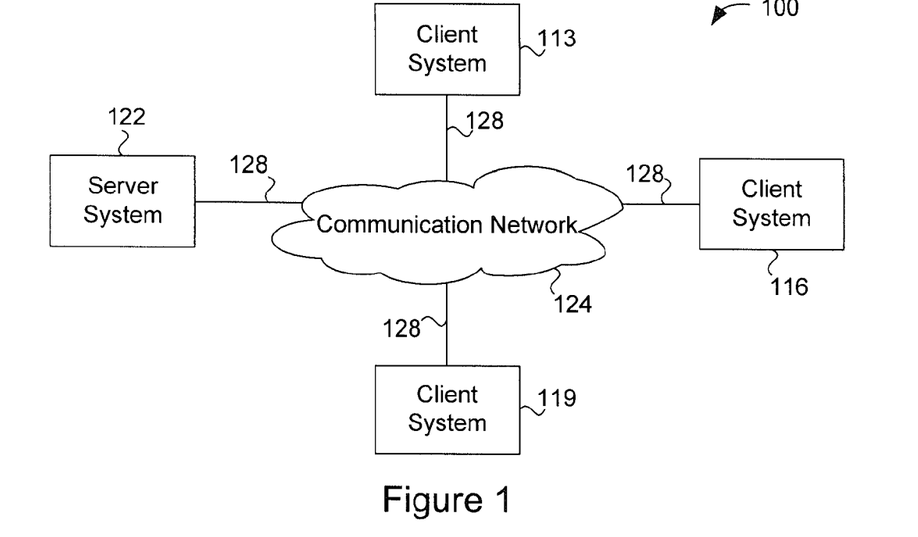
FIG. 1 shows a block diagram of a client-server system and network in which an embodiment of the invention may be implemented.

FIG. 1 is a simplified block diagram of a distributed computer network 100. Computer network 100 includes a number of client systems 113, 116, and 119, and a server system 122 coupled to a communication network 124 via a plurality of communication links 128. There may be any number of clients and servers in a system. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment and is not intended to limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both a client or a server depending on whether the computer system is requesting or providing information. Additionally, although aspects of the invention have been described using a client-server environment, it should be apparent that the invention may also be embodied in a stand-alone computer system. Aspects of the invention may be embodied using a client-server environment or a cloud-computing environment.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

Client systems 113, 116, and 119 enable users to access and query information stored by server system 122. In a specific embodiment, a "Web browser" application executing on a client system enables users to select, access, retrieve, or query information stored by server system 122. Examples of web browsers include the Internet Explorer browser program provided by Microsoft Corporation, and the Firefox browser provided by Mozilla Foundation, and others.

Figure 2:
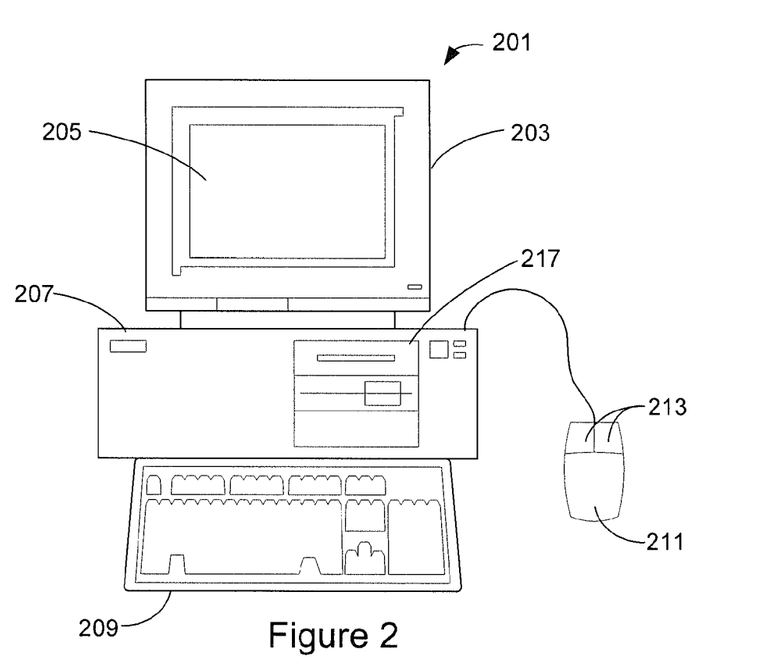
FIG. 2 shows a more detailed diagram of an exemplary client or computer which may be used in an implementation of the invention.

FIG. 2 shows an exemplary client or server system. In an embodiment, a user interfaces with the system through a computer workstation system, such as shown in FIG. 2. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like.

Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive), battery-backed-up volatile memory, tape storage, reader, and other similar media, and combinations of these.

A computer-implemented or computer-executable version of the invention may be embodied using, stored on, or associated with computer-readable medium or non-transitory computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software may also be stored or reside on mass storage device 217 (e.g., hard disk, magnetic disk, tape, or CD-ROM). As a further example, code may be transmitted via wires, radio waves, or through a network such as the Internet.

Figure 3:
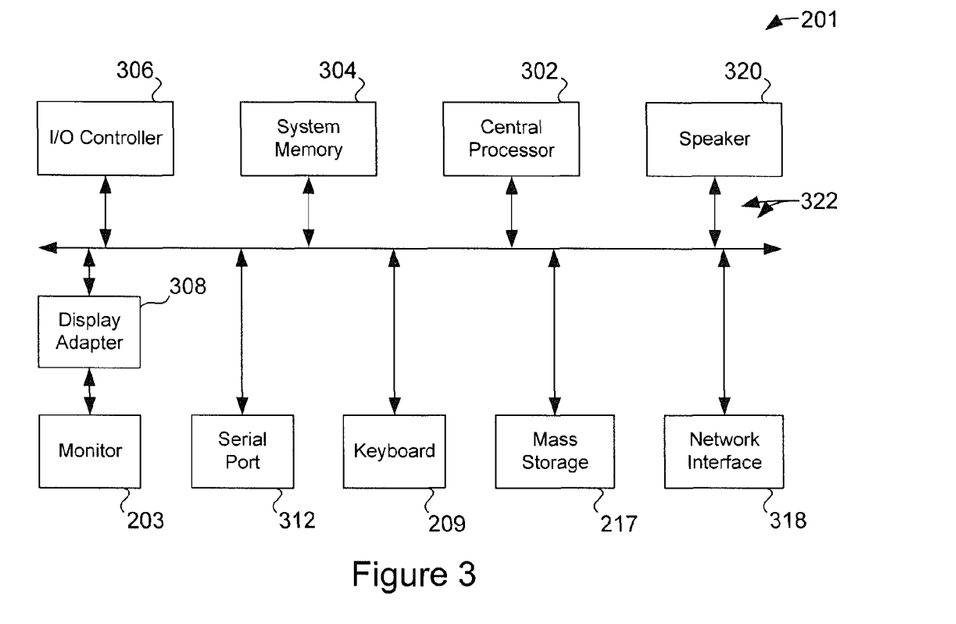
FIG. 3 shows a system block diagram of a client computer system.

FIG. 3 shows a system block diagram of computer system 201. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. In an embodiment, a computer system includes additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a suitable computer system. Other configurations of subsystems suitable for use will be readily apparent to one of ordinary skill in the art.

Computer software products may be written in any of various suitable programming languages, such as C, C++, C#, Pascal, Fortran, Perl, Matlab (from MathWorks), SAS, SPSS, JavaScript, AJAX, Java, SQL, and XQuery (a query language that is designed to process data from XML files or any data source that can be viewed as XML, HTML, or both). The computer software product may be an independent application with data input and data display modules. Alternatively, the computer software products may be classes that may be instantiated as distributed objects. The computer software products may also be component software such as Java Beans (from Oracle Corporation) or Enterprise Java Beans (EJB from Oracle Corporation). In a specific embodiment, the present invention provides a computer program product which stores instructions such as computer code to program a computer to perform any of the processes or techniques described.

An operating system for the system may be one of the Microsoft Windows® family of operating systems (e.g., Windows 95, 98, Me, Windows NT, Windows 2000, Windows XP, Windows XP x64 Edition, Windows Vista, Windows 7, Windows CE, Windows Mobile), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

Figure 4:
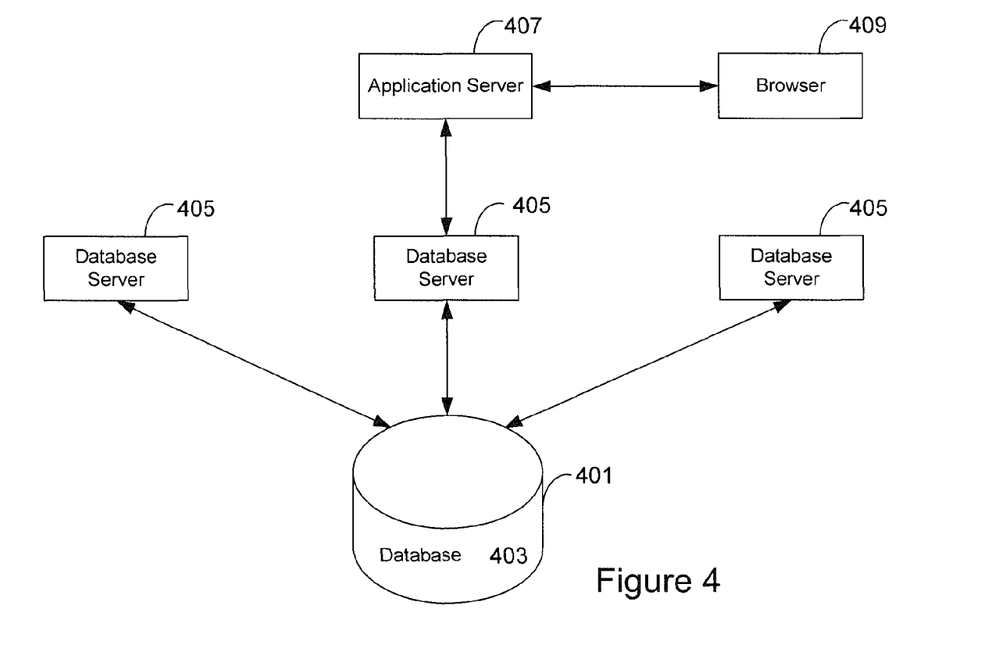
FIG. 4 shows a data source or data service in the form of a database system.

FIG. 4 shows a data source or data service in the form of a database system. A database may be part of a database management system. One suitable database management system architecture is a three-tiered architecture as shown.

In a first tier is the core of a database management system, a central storage 401 that holds or stores a database or repository 403. The database typically resides on one or more hard drives, and is generally part of a larger computer system. The information may be stored in the database in a variety of formats. An example is an Extensible Markup Language (XML) database. An XML database is a data persistence software system that allows data to be stored in XML format. Another example is a relational database management system (RDMS) which uses tables to store the information.

In a second tier are database servers 405. The database servers are instances of a program that interacts with the database. Each instance of a database server may, among other features, independently query the database and store information in the database. Depending on the implementation, the database servers 405 may or may not include user-friendly interfaces, such as graphical user interfaces.

In a third tier is an application server 407. There may be multiple application servers. In an implementation, the application server provides the user interfaces to the database servers. By way of example, the application server may be a web application server on the Internet or any other network. The application server may also be a virtual database server or a virtual directory server. The application server may provide user-friendly mechanisms and interfaces for accessing the database through the database servers. In an implementation, a web browser 409 is utilized to access the application server.

Figure 5:
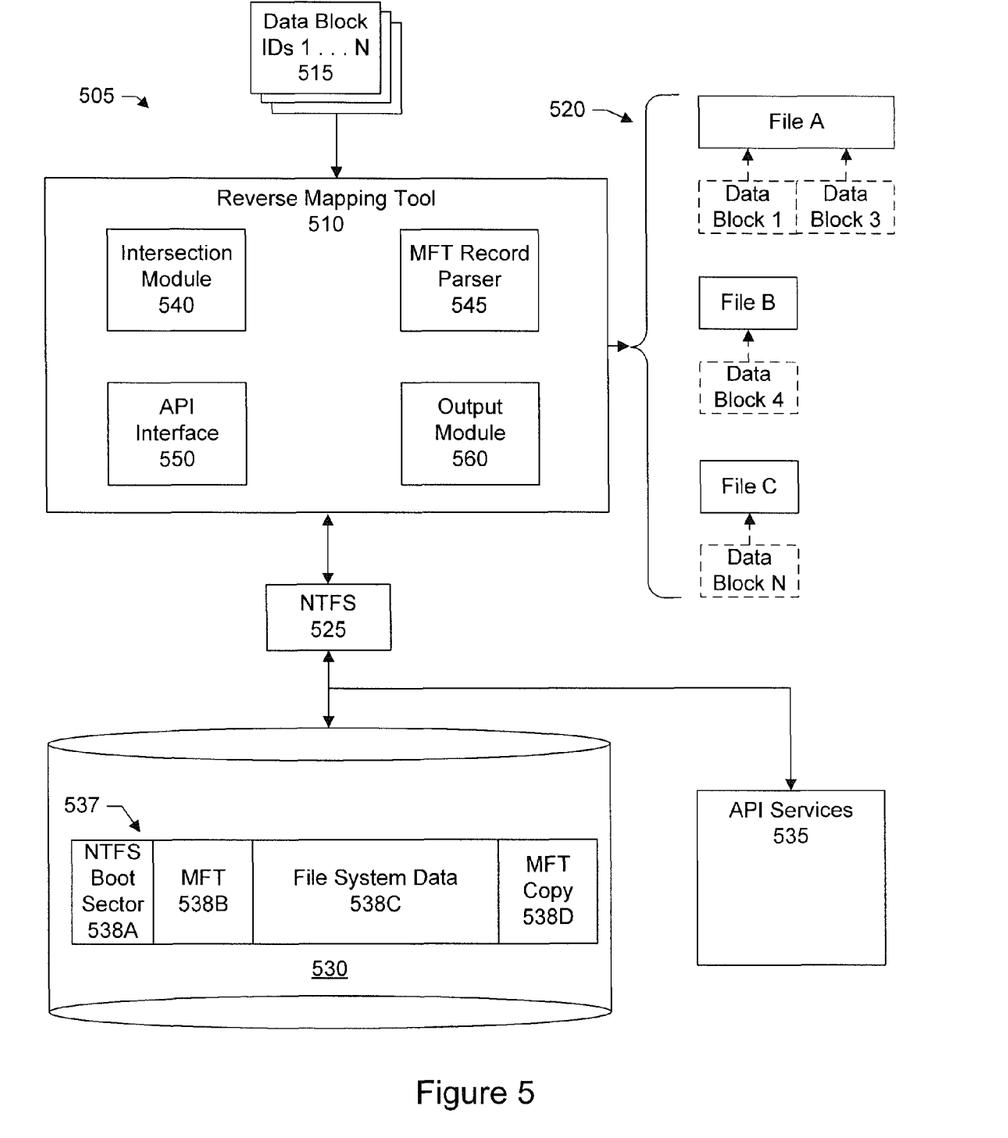
FIG. 5 shows a block diagram of a specific embodiment of a reverse mapping tool to facilitate data backup and recovery.

FIG. 5 shows a block diagram of a file system environment 505 in which a specific implementation of a tool or application program for reverse mapping blocks to files may be used. As shown in FIG. 5, there is a reverse mapping tool 510, an input 515 to the tool, an output 520 by the tool, a file system 525, a storage 530, and application programming interface (API) services 535 that may be provided by the file system or an operating system of the file system. The reverse mapping tool may include an intersection module 540, a file table record parser 545, an API interface 550, and an output module 560.

Figure 6:
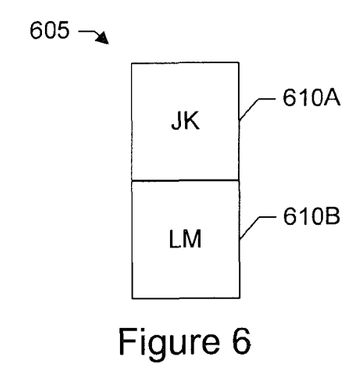
FIG. 6 shows a block diagram of a file and its data blocks.

In a specific implementation, the tool receives as input one or more data block identifiers 515 (e.g., identifiers 1 . . . N). In this specific implementation, the identifiers do not include actual data content of a block and instead include an indication, identification, or specification of the blocks on the storage device or volume where the actual data content is located. This helps to conserve system resources because the actual data in the block is not being received. The tool can map or reverse map the data blocks to the files that they belong to. For example, as shown in FIG. 6, a file 605 can include one or more blocks of data such as blocks 610A and 610B having content JK and LM, respectively. Generally, a file is stored on media (e.g., hard disk) in one or more blocks. In other words, a file or a file's contents may be divided into one or more blocks of content. Typically, a block is of a predetermined uniform size such as 1 kilobyte, 4 kilobytes, and so forth. The size can range from about 512 bytes to about 64 kilobytes, but the range and size of a block can vary depending on, for example, the particular file system and size of the storage media. A block may be referred to as a sector, cluster, disk space unit, or allocation unit.

Referring to FIG. 5, in a specific implementation, the tool outputs 520 a list including one or more files or file paths that the received blocks (or a subset of the received blocks) have been mapped to. For example, the tool may map received data blocks 1 and 3 to file A and output a list including file A. The tool may map received data block 4 to file B and the outputted list may include file B, and so forth. The output may provided programmatically such as in response to an API request so that further processing can occur, provided to an electronic display or printer, provided in an e-mail, e-mail attachment, or other notification, or combinations of these. The output may be in any suitable format such as XML, HTML, text file, ASCII, and so forth.

In a specific embodiment, the tool is implemented in a file-based backup system. Generally, in file-based backup systems, backups of files and folders are made by traversing the file system tree. In the case of incremental backups, the tool can identify the files, folders, or both to be backed up without the back up system having to traverse the full file system and compare timestamp or archive bit information for each file to find out the modified or new files for incremental backups. Further, the tool can be used without journaling being enabled to find the modified or new files.

Traversing the entire file system to find the files that should be backed up can take a significant amount of time and resources. For example, in some cases the backup window for dense file system backups may be longer than a day. This can cause an undesirable level of interruption in the normal operations of a company or organization because there can be performance impacts on the system being backed up. For the period of time that a computer system is being backed up, the hard drive may be busy reading files for the purpose of backing up, and its full bandwidth may not be available for other tasks. Indeed, traversing the file system tree may take more time than actually backing up the data. Enabling journaling to find modified or new files can also result in performance overhead or impacts. Further, journaling typically requires adequate space (e.g., disk space) for the journal and journal overflow.

For file-based backup systems, the reverse mapping techniques as described in this application can identify the data objects (e.g., files, directories, or both) on a storage volume to be backed up to a backup volume without traversing the entire file system tree, without journaling being enabled (i.e., journaling is disabled, turned off, or not turned on), and without having to maintain file system state information. This allows for more efficient backups of files, less consumption of resources, less interruption, and shorter backup windows. The data objects on the storage volume to be backed up may be changed data objects. That is, the data object (e.g., file) has been changed, modified, or altered since the last backup. Alternatively, the data object on the storage volume to be backed up may be a new data object, such as a file that was created on the storage volume after the last backup of the storage volume.

In another specific embodiment, the tool is implemented in a block-based backup system. Block-based systems backup changed blocks in the file system. For example, in a block-based system the portion or block of a data object (e.g., file) that has changed since the last backup is backed up rather than the entire data object (e.g., entire file). It is desirable to identify or index the changed files or backed-up files between backups in order to allow for efficient file-based recoveries out of block-based backups. However, in some cases indexing results in walking the entire file system tree or indexing files that have already been indexed. Re-indexing files already indexed can be an inefficient use of resources.

For block-based backup systems, the reverse mapping techniques as described in this application can identify the data objects (e.g., files, directories, or both) whose blocks have been backed up without traversing the entire file system tree, without journaling being enabled, and without having to maintain file system state information. The tool can allow for indexing of just the changed data objects (e.g., files), new data objects, or both between backups or incremental backups instead of all the data objects.

In a specific implementation, the tool is adapted for use with the file system or file system format referred to as the New Technology File System (NTFS) provided by Microsoft. In other embodiments the tool may be implemented for use with other file systems such as the Unix File System (UFS), VMware Virtual Machine File System (VMFS), Hierarchical File System (HFS), Hierarchical File System Plus (HFS Plus), File Allocation Table (FAT), Oracle Automatic Storage Management Cluster File System (Oracle ACFS), Journaled File System (JFS), second extended file system (Ext2), third extended file system (Ext3), fourth extended file system (Ext4), and many others.

An NTFS file system includes a layout 537 on the disk including an NTFS boot sector 538A, a file table 538B, a file system data or a data region 538C for storing file content, and an file table copy 538D. The boot sector includes information regarding the layout of the file system (offset to the file table), and details related to booting from the file system.

In NTFS, the file table is referred to as the Master File Table (MFT). The MFT is organized to include file information via a set of MFT records. The MFT is itself treated like a file in NTFS. Each MFT record and as an extension each file includes information regarding the file such as timestamps, 48-bit MFT record number, and 16-bit update sequence number. The combination or concatenation of the MFT record number and update sequence number yield a 64-bit number referred to as the File Reference Number (FRN). In other words, on a typical NTFS volume, file information such as file name, creation date, access permissions, contents and so forth, are stored as metadata in the Master File Table (MFT). Each file, directory, or both in the file system is represented by a unique MFT record in the MFT. Also, each file, directory, or both in the file system can be referred by means of a File Reference Number (FRN). On a typical NTFS volume, sectors can be segregated into three sets: MFT zone sectors, files or actual data, and index records.

When a file, directory, or both is created on an NTFS volume, a record is created for the file or directory. The record is used to store information about the file or directory. There is at least one entry in the MFT for every file on an NTFS file system volume, including the MFT itself. Information about a file, including its size, time and date stamps, permissions, and data content, is stored either in MFT entries, or in space outside the MFT that is described by MFT entries. As files are added to an NTFS file system volume, more entries are added to the MFT and the MFT increases in size. When files are deleted from an NTFS file system volume, their MFT entries are marked as free and may be reused. However, disk space that has been allocated for these entries is not reallocated, and the size of the MFT does not decrease. The NTFS file system reserves space for the MFT to keep the MFT as contiguous as possible as it grows. The space reserved by the NTFS file system for the MFT in each volume is called the MFT zone.

Since the MFT tracks file system metadata, it follows that any change to a file, directory, or both on the file system translates to a corresponding change in the MFT record for the file or directory within the MFT zone. The tool can examine the MFT zone sectors for these changes.

In a specific implementation, upon receipt of the data block identifiers by the tool, intersection module 540 intersects the received data block identifiers with the MFT zone blocks to make, create, produce, or generate an intersect. The intersect includes the MFT records corresponding to the data block identifiers. That is, the intersect may include a subset of the MFT records rather than all the MFT records. MFT record parser 545 is responsible for parsing each record in the subset of MFT records to select the desired MFT records. From the selected MFT records of the subset, the tool obtain the FRNs. Using the FRN, the tool can send a request through API interface 550 to API services 535 to obtain file name information. The technique allows parsing of a subset of the MFT records or at most a subset of records rather than all of the MFT records. That is, the changed files, directories, or both between back-ups or between incremental backups can be identified without having to parse each record of the MFT.

Figure 7:
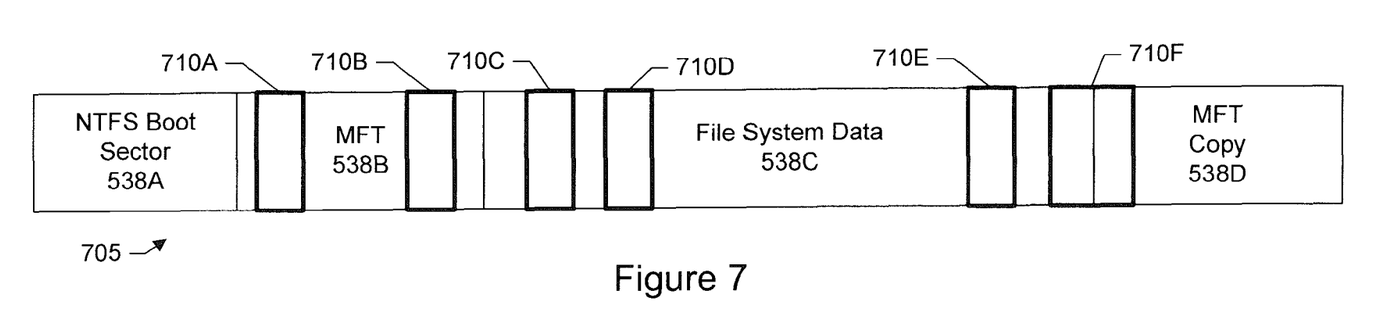
FIG. 7 shows a block diagram of changed blocks on an NTFS layout.

For example, FIG. 7 shows an example of an NTFS layout 705 where areas 710A-710F represent changed blocks. In a specific implementation, in a first step, the tool finds what changed blocks are part of Master File Table (by using MFT record zero). Thus, in the example shown in FIG. 7, blocks 710A and 710B are part of the MFT. The tool can ignore the rest of the blocks. The tool can parse the relevant MFT records which are part of Master File Table and obtain FRN for each relevant MFT record. Then by using Windows provided APIs the tool can get the full file path.

Figure 8:
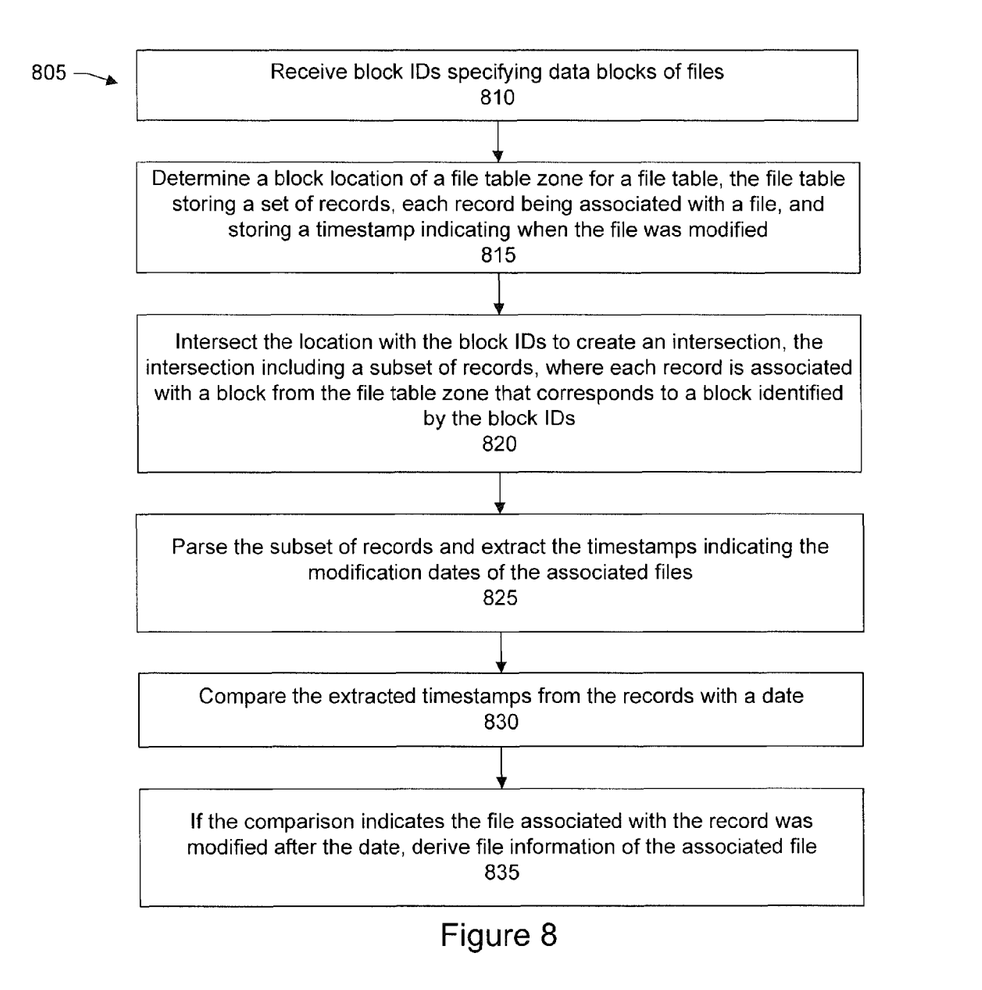
FIG. 8 shows an overall flow diagram for reverse mapping blocks to files.

FIG. 8 shows an overall flow 805 of tool operation. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other implementations may not be exactly the same as the steps presented and may be modified or altered as appropriate for a particular process, application or based on the data.

In brief, in a specific implementation, the tool receives data blocks in the form of extents. An extent is a contiguous area of storage in a file system. In this specific implementation, the extent is tuple (A, B) where A denotes the block number and B refers to the length of the extent. For example (10000, 200) can mean starting from 10000th block till 10200 blocks are modified. That is, the extent identifies a set of blocks where the set starts at block 10000 and ends at block 10200, e.g., start at block 10000 and count 200 blocks to block 10200. In this specific implementation, the tool parses MFT record zero to locate an MFT Zone. The MFT Zone includes an array of MFT records. This location information can be converted to an extent. For example if the MFT Zone is starting from 10000th block till 15000th block then the corresponding extent is (10000, 5000). Once this extent is identified, the tool compares this with the input data block identifiers. The tool finds the common blocks between these two extents.

For example, if the MFT zone is (10000, 5000) and input data block identifiers are {(1000, 100), (5000, 100), (10000, 100), (20000, 200)}, then the common blocks are {(10000, 100)}. Generally, the resultant extents of this intersection operation is within the MFT Zone. In this specific implementation, the tool may now parse only these common blocks. These common blocks are MFT records. The rest of the data block identifiers including actual data blocks and index records and can be ignored.

In this specific implementation, analysis of these MFT records includes extracting Standard Information or information from the standard information attribute of an MFT record to see whether the file has indeed been modified. In some cases, this step is performed because sometimes operating system files are run for the operating system to fulfill its functionalities. In this case, the file may not have been modified, but the file's "Last access time" is modified. In this case, the file's corresponding data blocks may be part of the input of received data block identifiers and thus may be excluded. In this specific implementation, the result of the exclusion includes MFT records which are actually modified or correspond to modified data files.

In a specific implementation, the data block identifiers refer to, specify, or identify changed blocks (or sectors) on the volume. A changed block may refer to a block whose data content has changed since the last backup. Given a set of changed blocks on an NTFS volume, the tool reverse maps each changed sector or block to the file that it belongs to. From the set of changed sectors on the volume, the tool extracts the sectors in use by NTFS. From these, the tool filters out the sectors belonging to the data section of the MFT itself. At this point in time, there is a list of MFT records (one MFT record=at least 2 NTFS sectors). Each MFT record is further processed to extract an MFT record sequence number (16 bits) and an MFT record number (48 bits). The FRN of the file corresponding to this record is a concatenation of the sequence number and the record number, i.e., a 64-bit FRN=16-bit sequence number+48-bit MFT record number. From the list of FRNs the tool opens the file in question by using its FRN via the NtCreateFile API using the FILE_OPEN_BY_FILE_ID option. Once a handle to the file is obtained, the tool uses the GetFileInformationByHandle API to obtain the file information.

In other words, any change to a file changes the MFT record for the file itself due to changes to timestamps, and so forth. In a specific implementation, the tool examines the changed blocks and segregates blocks into the categories MFT records and other data (superset of the actual file blocks) by using MFT record zero (the first record in Master File Table). This record includes information about Master File Table location information. From each changed MFT record the tool extracts the file reference number (FRN). The tool uses the API NtCreateFile (FILEOPEN_BY_FILE_JD option) to open a handle to the file using the FRN instead of the path. Upon obtaining the handle, the tool uses the GetFileInformationByHandle API to obtain the file name.

Referring now to FIG. 8, in a specific implementation, in a step 810, the tool receives one or more block identifiers. As discussed above, in a specific implementation, a block identifier is received as an extent. In this specific implementation, the extent includes a first value, and a second value. The first value indicates a starting location or starting block of the extent. The second value indicates a length of the extent. It should be appreciated, however, that a block identifier may be any value or combination of values that identify a particular block or set of blocks. For example, in another specific implementation, the second value may indicate an ending block of the extent. An identifier may include a block address, a starting address or location, an ending address or location, a number of blocks between a starting and ending address or location, a virtual cluster or block number, a starting logical cluster or block number, or combinations of these. An identifier may be in a hexadecimal or decimal format. An identifier may include numbers, letters, characters, or combinations of these.

In a specific implementation, the identifiers are received from a VMware module referred to as the Changed Block Tracking (CBT) module or feature. In another specific implementation, the identifiers may be received from a file system driver. The file system driver may be an in-house developed file system driver. The identifiers may be received from an external source or a source that is external or not integrated or built-in to the file system. That is, the source may include code or a code component that is not native to the file system.

In a step 815, the tool determines a block location of a file table zone for a file table. The file table stores a record for each data object (e.g., file) on the volume including a record for the file table itself. The file table may include a record for the file table and other records for other files on the volume. That is, a record may be associated with a file and may store metadata for the associated file such as a timestamp indicating a date, time, or both when the associated file was modified or last modified. As discussed above, in a specific implementation, the file table is a Master File Table (MFT) as provided in or maintained by the NTFS file system or operating system.

Figure 9:
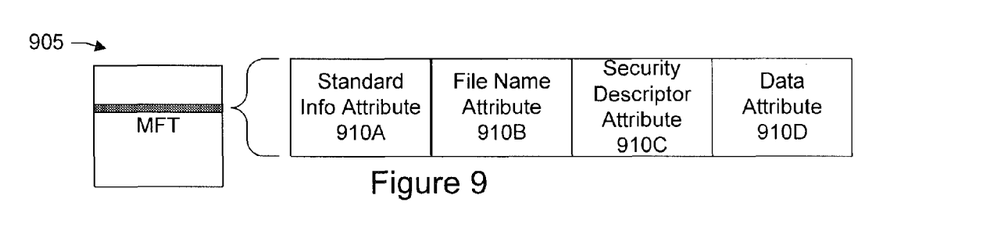
FIG. 9 shows a block diagram of a Master File Table (MFT) record.

FIG. 9 shows an example of a record 905 that may be stored in the MFT. The record may be referred to as an entry. As discussed above, the record describes the associated file (or directory). The record includes a set of attributes including a standard information attribute 910A, a file name attribute 910B, a security descriptor attribute 910C, and a data attribute 910D.

The standard information attribute may include information such as read/write permissions of the associated file, creation time of the associated file, last modification time of the associated file, a count or number of how many directories point to the associated file (e.g., a hard link count). The file name attribute describes the file name in the Unicode character set. There can be multiple file names such as when the file has multiple links or the file has an MS-DOS short name. The security descriptor attribute lists which user owns the associated file, which users can access the associated file, and how the users can access the associated file.

Depending on the size of the associated file, the data attribute can include the actual file data such as in the case of a small file or small file size. Alternatively, if the file size is large, the data attribute can include pointers or an index to the actual file data (or pointers to the objects that point to the actual file data). The pointers to the data may include pointers to sequences of logical clusters or blocks on the disk. Each sequence may be identified by three parts including a starting cluster in the file referred to as the virtual cluster number (VCN), a starting logical cluster (LCN) of the sequence on the disk, and a length that is counted as a number of clusters. The run of clusters may be referred to as an extent. In other words, the data attribute of a record can be used to specify or identify the data blocks of the file that is associated with the record.

In this specific implementation, an initial record of the MFT (e.g., MFT record or entry 0) is parsed to identify the block location of the MFT zone where the MFT is stored. For example, parsing the initial record can identify a starting and ending block of the MFT zone. In a specific implementation, the starting and ending blocks of the MFT zone are converted into an extent that may be referred to as the block location of the MFT zone. It should be appreciated, however, that the block location of the MFT zone can be any value or set of values that can identify the blocks reserved or allocated to the MFT zone.

Referring now to FIG. 8, in a step 820, the tool intersects the block location of the file table zone with the received block identifiers to create an intersect of common blocks. In a specific implementation, the intersect includes a subset of file table records where each record in the subset is associated with a block from the file table zone that corresponds to a block identified by the received block identifiers.

For example, if a file table record is associated with a block identified as "357" in the file table zone and the received block identifiers includes an identifier identifying block "357" then the record may be included in the subset of file table records. Conversely, if the received block identifiers do not include an identifier identifying block "357" then the record may be excluded or omitted from the subset. That is, a file table record that is associated with a block from the file table zone may be excluded or omitted from the subset if the block does not correspond to a block identified by the received block identifiers. The intersecting may include scanning or comparing the block location of the file table zone and the received block identifiers to find matching blocks.

In a step 825, the tool parses the subset of file table records to extract the timestamps indicating the last modified dates of the files associated with the subset of file table records. The technique allows for parsing at most a subset of the file table records rather than all of the file table records because a number of file table records in the subset may be less than a number of file table records in the file table. That is, the number of file table records may be greater than the number of file table records in the subset. A number of timestamp extractions may be less than a number of file table records in the file table. The number of file table records may be greater than the number of timestamp extractions.

In other words, there can be a remaining subset of file table records that are not parsed or analyzed. The remaining subset of file table records may not be parsed because the file table records in the subset may be associated with blocks from the file table zone that do not correspond to blocks identified by the block identifiers. Depending upon factors such as the number of data blocks identified by the received data block identifiers, a number file table records in the remaining subset may be greater than the number of file table records in the subset. Thus, the number of file table records parsed may be less than the number of file table records in the remaining subset. Limiting the number of file table records that need to be parsed or analyzed can improve system performance.

In a step 830, the tool compares the extracted file table record timestamps indicating the last modified dates of the associated files with a date. In a step 835, if the comparison indicates the associated file was modified after the date, the tool derives file information for the associated file such as a file path to the associated file. The comparison allows the tool to confirm or verify that the associated file was indeed modified. For example, some operating systems will track or record a file's last access time including a last access time of operating system files. Data blocks associated with these accessed operating system files may be included with the received block identifiers (step 810) even if the files have not been modified. Thus, the comparison may be performed in order to exclude or omit these files. As discussed below, in a specific implementation, the date (steps 830 and 835) is a date of the last backup (see FIGS. 10-11). In another specific implementation, the date is a date of the next-to-last backup (see FIGS. 12-13).

Figure 10:
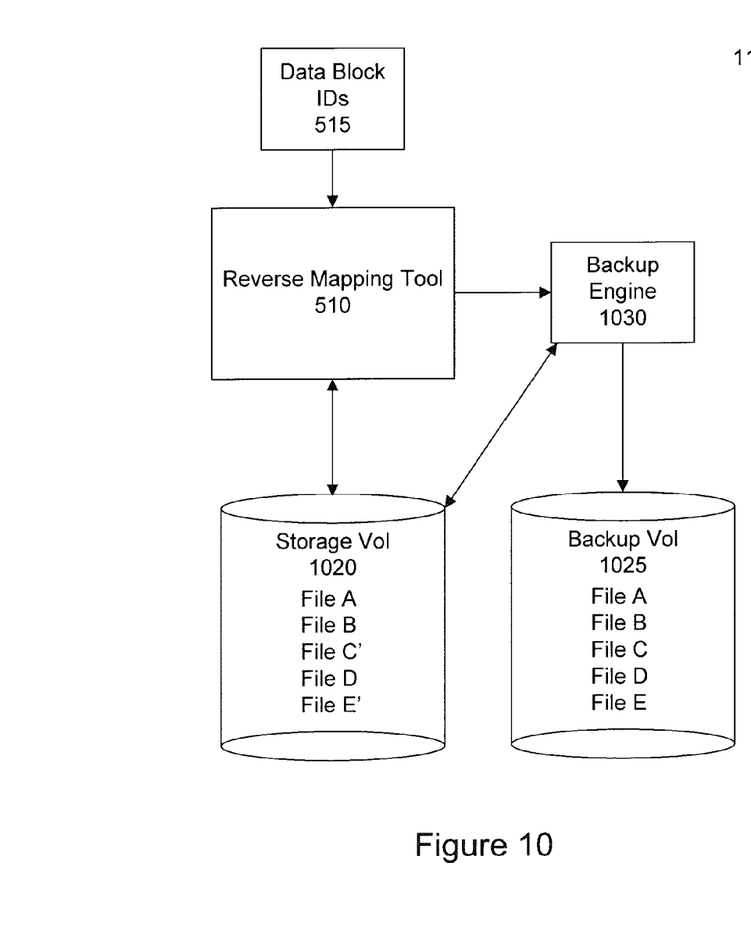
FIG. 10 shows a block diagram of a specific implementation of the tool with a file-based backup system.
Figure 11:
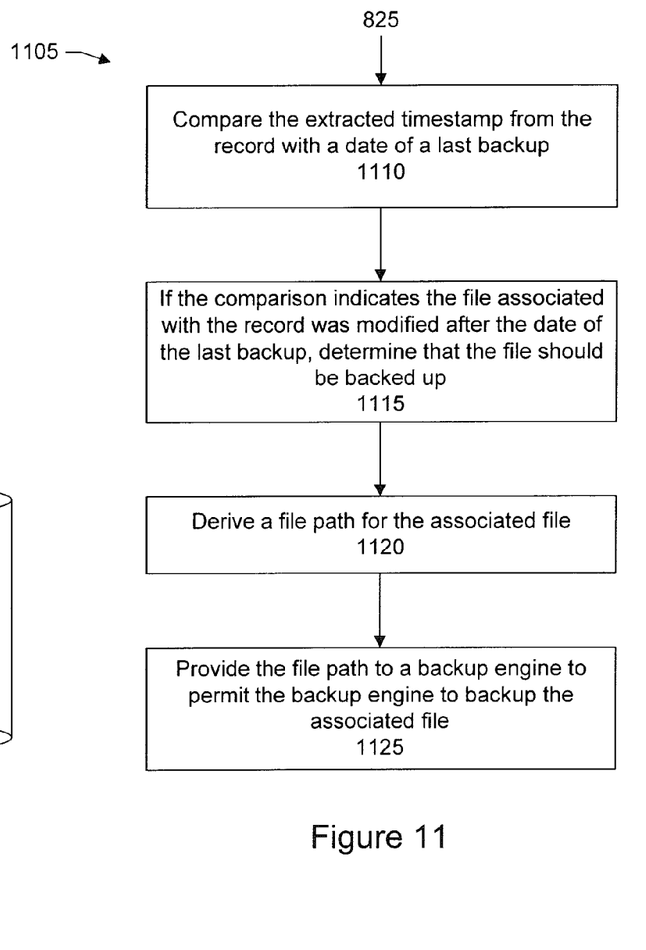
FIG. 11 shows a flow diagram for an application of the tool in a file-based backup system.

Referring now to FIGS. 10-11, a specific implementation or application of the tool is in a file-based backup system. An example of such a system is shown in FIG. 10. FIG. 10 shows a block diagram of a specific implementation of the tool to facilitate file-based backups. As shown in the figure, there is reverse mapping tool 510 receiving block identifiers 515, a storage volume 1020, a backup volume 1025, and a backup engine 1030 to back up files on the storage volume to the backup volume. The tool can quickly identify the files on the storage volume that should be backed up to the backup volume. For example, in the case of incremental backups, it is desirable to backup files that have changed since a date of a last backup, files that have been created since the date of the last backup (i.e., new files), or both. Files that have not changed since the date of the last backup may not be selected for backed up in a current backup because these files may have been already backed up in a previous backup (e.g., a backup before the last backup).

For example, as shown in FIG. 10, the storage volume includes files A, B, C', D, and E' and the backup volume includes files A, B, C, D, and E. Files A, B, C, D, and E have been backed up to the backup volume in a last backup (or a backup before the last backup). Files C' and E', however, have not been backed up to the backup volume. For example, files C and E may have been changed, modified, or altered since the last backup as indicated by the prime symbol shown in the figure. In this specific implementation, upon receiving the block identifiers specifying data blocks on the storage volume that have changed since the last backup, the tool consults the file table and can quickly identify files C' and E' as having been changed since the date of the last backup without having to parse each record of the file table. The tool can derive file information for the files (e.g., a file path) and provide the file information to the backup engine. The backup engine can then access the storage volume to backup files C' and E' to the backup volume.

FIG. 11 shows a flow 1105 for the specific implementation of the tool shown in FIG. 10. An arrow 825 corresponds to step 825 from FIG. 8 (parse subset of file table records to extract the timestamps indicating the modification dates of the associated files). In a step 1110, the tool compares the extracted timestamp from the file table record with a date of a last backup of the storage volume. In a step 1115, if the comparison indicates the file associated with the file table record was modified after the date of the last backup, the tool determines that the file should be backed up.

For example, the extracted timestamp from the file table record may indicate that the file was modified Oct. 7, 2011, 7:31:05 PM, and the date of the last backup may be Oct. 6, 2011, 4:22:34 PM. Thus, in this example, the tool determines that the file should be backed up because it was modified after the date of the last backup. As another example, the extracted timestamp from the file table record may indicate that the file was modified Oct. 5, 2011, 7:31:05 PM. Thus, in this example, the tool determines that the file should not be backed up (or included in the current backup) because it was modified before the date of the last backup and thus would have been backed up in the last backup (or a backup before the last backup). The timestamp, date, or both may include any value or combination of values to identify a particular point in time (e.g., month, day, year, time, hour, or seconds).

In a step 1120, upon determining that the file associated with the file table record should be backed up, the tool derives a file path for the associated file. In a specific implementation (e.g., an implementation with an NTFS file system), a method to derive the file path includes extracting from the selected file table record a first value and a second value, and joining the first value and the second value to form a third value. In this specific implementation, the first value includes the 16-bit MFT record sequence number. The second value includes the 48-bit MFT record number. Generally, each MFT record is addressed by a 48-bit MFT entry value and has a 16-bit sequence number that is incremented when the entry is allocated. The third value may be referred to as the file reference number (FRN). The FRN is the concatenation of the sequence number and the record number, i.e., 16-bit sequence number+ 48-bit MFT record number=64-bit FRN. The 16-bit sequence number may be located at the 6th byte and the MFT record number may be at the 20th byte in the MFT record.

In this specific implementation, the method further includes generating and sending a first request including the third value to a first API, receiving a response including a fourth value from the first API, generating and sending a second request including the fourth value to a second API, and receiving a fifth value from the second API, the fifth value being the file or directory information. In this specific implementation, the first API is the API "NtCreateFile." The second API is the API "GetFileInformationByHandle." In other words, in this specific implementation, given an FRN, the tool opens or accesses the file in question by using its FRN via the "NtCreateFile" API using the "FILE_OPEN_BY_FILE_ID" option. Once a handle to the file is obtained, the tool uses the "GetFileInformationByHandle" API to obtain the file name information.

In this specific implementation, the APIs are provided by the Windows operating system. These APIs allow a full, complete, or absolute file path to be obtained which may be desirable for certain backup systems. The file name attribute of an MFT record may provide only a partial path. For example, in a case where the file "C:\windows\system32\config" is changed and should be backed up; the corresponding MFT record will have the file name attribute as "config" and not the full file path (e.g., "C:\windows\system32\config"). Some backup systems, however, require the full file path. Thus, the tool by calling the appropriate APIs can provide the full file path.

It should be appreciated, however, that depending upon the particular file system, backup engine, or both calling such APIs will be optional. For example, if a particular file table records full path information for the associated files then the full path can be determined by extracting the full path from the file table record. An API may not be called. Likewise, if a particular backup engine does not require a full file path and a file name is sufficient, the API may not be called. Thus, in another specific implementation, the tool provides a relative path or a filename not including the file path.

A path may include any value or combination of values to specify a particular file or directory in a file system. For example, a path may include a filename, directory name, subdirectory, drive letter, server name, device name, volume name, root directory, user directory, file extension, or combinations of these. A path may include one or more path components defined by a delimiting character such as a slash (e.g., "/"), backslash (e.g., "\"), colon (e.g., ":"), or other depending upon the operating system. For example, the path component "C:\" represents the drive letter "C:" or root directory.

In a step 1125, the tool provides or transmits the file information (e.g., file path) to the backup engine to permit the backup engine to back up the file, directory, or both.

Figure 12:
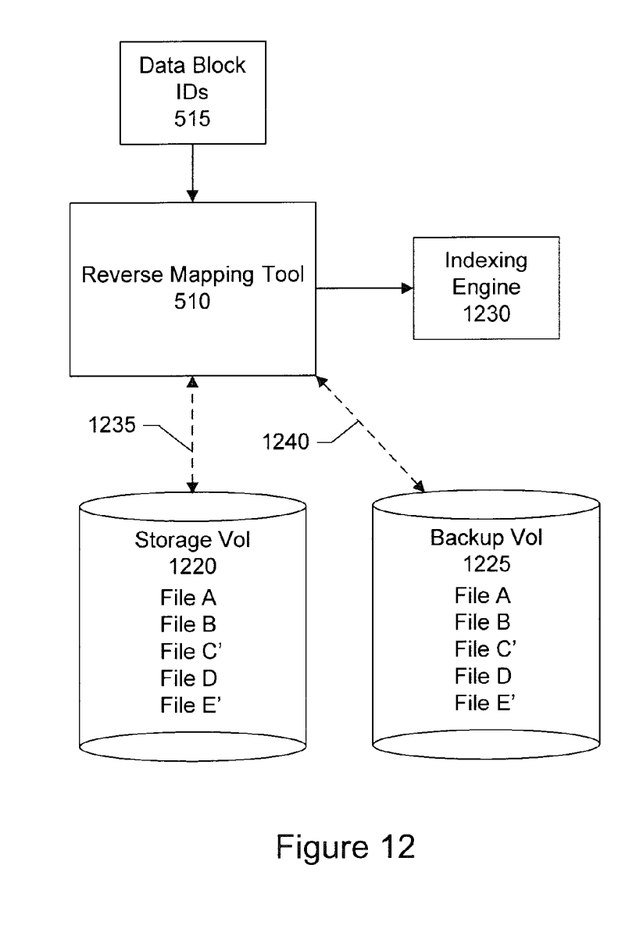
FIG. 12 shows a block diagram of a specific implementation of the tool with a block-based backup system.
Figure 13:
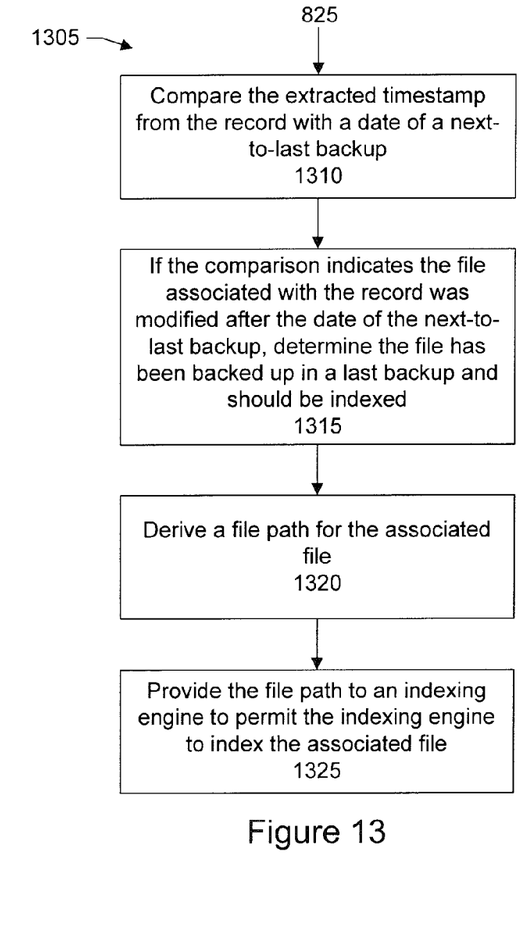
FIG. 13 shows a flow diagram for an application of the tool in a block-based backup system.

FIGS. 12-13 show another specific implementation or application of the tool in a block-based backup system. FIG. 12 shows a block diagram of a specific implementation of the tool to facilitate file indexing in a block-based backup system. As shown in the figure, there is reverse mapping tool 510 receiving block identifiers 515, a storage volume 1220, a backup volume 1225, and an indexing engine 1230 to index the backed-up files on the backup volume for file-based recoveries or restorations. In a block-based backup model, the tool can complement the backup strategy to permit or allow indexing of just the changed files between backups instead of all the files. In other words, files already indexed are not re-indexed.

For example, as shown in FIG. 12, the storage volume includes files A, B, C', D, and E'. Similarly, the backup volume includes files A, B, C', D, and E'. In a last backup, the block-based backup system has backed up data blocks that happened to be associated with files C and E because these files had been modified after a next-to-last backup (e.g., a penultimate backup or a backup immediately before the last backup) as indicated by the prime symbol for files C and E as shown in the figure. In this specific implementation, the tool can quickly map these recently backed up blocks to the files they are associated with (e.g., files C' and E') so that the files can be indexed without having to re-index the other files (e.g., files A, B, and D) that have already been indexed.

FIG. 13 shows a flow 1305 for the specific implementation of the tool shown in FIG. 12. An arrow 825 corresponds to step 825 from FIG. 8 (parse subset of file table records to extract the timestamps indicating the modification dates of the associated files). In a step 1310, the tool compares the extracted timestamp from the file table record with a date of a next-to-last backup of the storage volume. In a step 1315, if the comparison indicates the file associated with the file table record was modified after the date of the next-to-last backup, the tool determines that the associated file (or more particularly, the one or more changed data blocks of the file) has been backed up in the last backup and that the file should be indexed.

For example, the extracted timestamp from the file table record may indicate that the file was modified October 7th, the date of the last backup may be October 10th, and the date of the next-to-last backup may be October 5th. In this example, the one or more (changed) data blocks of the file would have been included in the October 10th backup because the file (or more particularly, the one or more data blocks of the file) was modified after the date of the next-to-last backup, i.e., the October 5th backup. Thus, this file should be indexed.

In a step 1320, the tool derives a file path for the file that is associated with the file table record. A technique to derive the file path may be similar to the derivation technique shown in step 1120 (FIG. 11) and discussed above. In a step 1325, the tool provides the file path to an indexing engine to permit the indexing engine to index the file. The indexing can allow a user such as backup administrator to see what files are part of the backup.

FIGS. 12-13 show a specific implementation where the reverse mapping of data blocks to the files is performed after the block-based backups have been made. In this specific implementation, the tool may consult or access a file table on the storage volume (see broken arrow 1235), access a file table on the backup volume (see broken arrow 1240), or both. In this specific implementation, the tool receives the block identifiers after the data blocks specified by the identifiers have been backed up. In other specific implementations, the reverse mapping technique is modified so that the reverse mapping may occur before the block-based backups have been made or may occur concurrently with the block-based backups. Thus, the tool may receive the block identifiers before the data blocks specified by the identifiers have been backed up or may be receive the block identifiers while the data blocks are being backed up.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment.

What is claimed is:

1. A method comprising:
receiving a plurality of block identifiers identifying blocks on a storage volume;
determining a location of a file table zone that stores a plurality of file table records, each file table record storing a timestamp indicating a time a file associated with the file table record was last modified;
intersecting the location of the file table zone with the plurality of block identifiers to create an intersection comprising at least a subset of file table records, wherein each file table record in the subset is associated with a block from the file table zone that corresponds to a block identified by the plurality of block identifiers;
parsing each file table record of the subset of file table records to extract the timestamp indicating the time the file associated with the file table record was last modified;
comparing the extracted timestamp with a last backup date of the storage volume;
joining a record sequence number and a record number extracted from the file table record to form a file reference number (FRN); and
obtaining a file path of the associated file using the FRN, and providing the file path to a backup engine to permit the backup engine to backup the associated file, when the comparison indicates the associated file was modified after the last backup date.

2. The method of claim 1 wherein each block identifier comprises an extent having a first value, and a second value, the first value being a starting location of the extent, and the second value being a length of the extent.

3. The method of claim 1 wherein the location of the file table zone is represented by a first value, and a second value, the first value being a starting location of the file table zone, and the second vale being a number of blocks in the file table zone.

4. The method of claim 1 wherein obtaining the file path of the associated file further comprises:

receiving a handle to the associated file through a first application programming interface (API) using the FRN;
and
requesting the file path of the associated file through a second API using the handle.

5. The method of claim 1 wherein a number of file table records parsed to extract the timestamps is less than a number of file table records in the file table zone.

6. The method of claim 1 wherein a remaining subset of file table records is not parsed to extract the timestamp indicating the time the file associated with the file table record was last modified.

7. The method of claim 1 wherein the file table zone is a Master File Table (MFT) zone.

8. The method of claim 1 wherein the storage volume is formatted as a New Technology File System (NTFS) format.

9. A computer program product, comprising a non-transitory computer-readable medium having a computer-readable program code embodied therein, the computer-readable program code adapted to be executed by one or more processors to implement a method comprising:

receiving a plurality of block identifiers identifying blocks on a storage volume;
determining a location of a file table zone that stores a plurality of file table records, each file table record storing a timestamp indicating a time a file associated with the file table record was last modified;
intersecting the location of the file table zone with the plurality of block identifiers to create an intersection comprising at least a subset of file table records, wherein each file table record in the subset is associated with a block from the file table zone that corresponds to a block identified by the plurality of block identifiers;
parsing each file table record of the subset of file table records to extract the timestamp indicating the time the file associated with the file table record was last modified;
comparing the extracted timestamp with a last backup date of the storage volume;
joining a record sequence number and a record number extracted from the file table record to form a file reference number (FRN); and
obtaining a file path of the associated file using the FRN, and providing the file path to a backup engine to permit the backup engine to backup the associated file, when the comparison indicates the associated file was modified after the last backup date.

10. The computer program product of claim 9 wherein each block identifier comprises an extent having a first value, and a second value, the first value being a starting location of the extent, and the second value being a length of the extent.

11. The computer program product of claim 9 wherein the location of the file table zone is represented by a first value, and a second value, the first value being a starting location of the file table zone, and the second vale being a number of blocks in the file table zone.

12. The computer program product of claim 9 obtaining the file path of the associated file further comprises:

receiving a handle to the associated file through a first application programming interface (API) using the FRN;
and
requesting the file path of the associated file through a second API using the handle.

13. The computer program product of claim 9 wherein a number of file table records parsed to extract the timestamps is less than a number of file table records in the file table zone.

14. The computer program product of claim 9 wherein a remaining subset of file table records is not parsed to extract the timestamp indicating the time the file associated with the file table record was last modified.

15. A system for reverse mapping changed blocks on a file system volume to files, the system comprising:

a computer system comprising a processor;
a processor-based database management system executed on the computer system and configured to:
receive a plurality of block identifiers identifying blocks on a storage volume;
determine a location of a file table zone that stores a plurality of file table records, each file table record storing a timestamp indicating a time a file associated with the file table record was last modified;
intersect the location of the file table zone with the plurality of block identifiers to create an intersection comprising at least a subset of file table records, wherein each file table record in the subset is associated with a block from the file table zone that corresponds to a block identified by the plurality of block identifiers;
parse each file table record of the subset of file table records to extract the timestamp indicating the time the file associated with the file table record was last modified;
compare the extracted timestamp with a last backup date of the storage volume;
join a record sequence number and a record number extracted from the file table record to form a file reference number (FRN); and
obtain a file path of the associated file using the FRN, and provide the file path to a backup engine to permit the backup engine to backup the associated file, when the comparison indicates the associated file was modified after the last backup date.

16. The system of claim 15 wherein each block identifier comprises an extent having a first value, and a second value, the first value being a starting location of the extent, and the second value being a length of the extent.

17. The system of claim 15 wherein the location of the file table zone is represented by a first value, and a second value, the first value being a starting location of the file table zone, and the second vale being a number of blocks in the file table zone.

18. The system of claim 15 wherein a number of file table records parsed to extract the timestamps is less than a number of file table records in the file table zone.

19. The system of claim 15 wherein a remaining subset of file table records is not parsed to extract the timestamp indicating the time the file associated with the file table record was last modified.

20. The system of claim 15 wherein the file table zone is a Master File Table (MFT) zone.

\* \* \* \* \*